UNITED STATES PATENT OFFICE.

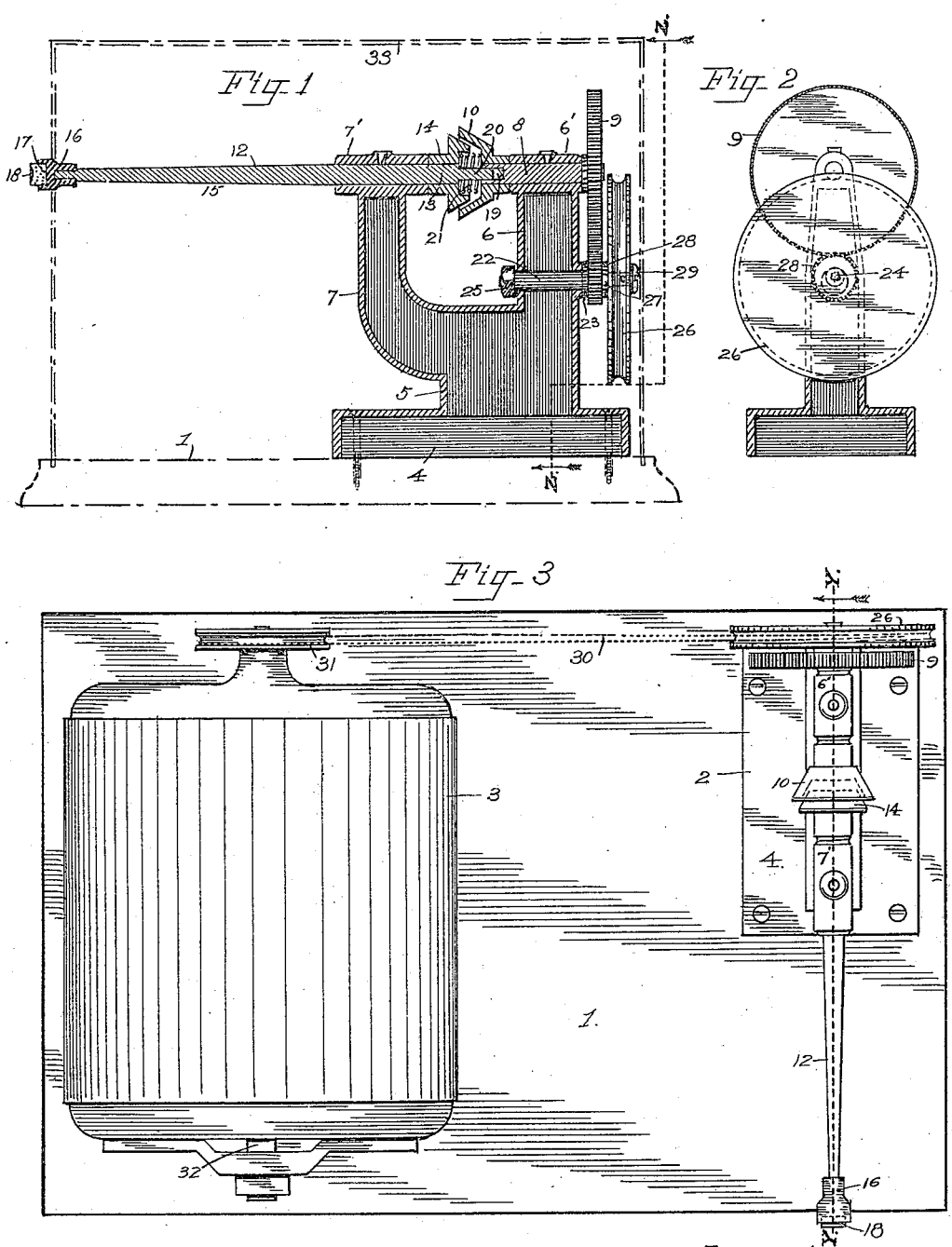

LISLE T. SCOTT, OF TOLEDO, OHIO, ASSIGNOR TO THE J. J. FREEMAN COMPANY, OF TOLEDO, OHIO.

WATCH-WINDING MACHINE.

949,781.  Specification of Letters Patent.  Patented Feb. 22, 1910.

Application filed September 7, 1909. Serial No. 516,424.

*To all whom it may concern:*

Be it known that I, LISLE T. SCOTT, a citizen of the United States, residing at Toledo, in the county of Lucas and State of Ohio, have invented a new and useful Improvement in Watch-Winding Machines, of which the following is a specification.

My invention relates to a watch winding machine for jewelers, and watch manufacturers and repairers, and has for its object to provide a machine of the kind, whereby a stock or collection of watches may be conveniently, quickly, and correctly wound without danger of over-winding.

I accomplish these objects by the construction and combination of parts, as hereinafter described and illustrated in the drawings, in which—

Figure 1 is a vertical section on line $y$—$y$ of Fig. 3, of a winding machine constructed in accordance with my invention. Fig. 2 is a vertical cross section on line $z$—$z$ of Fig. 1, and Fig. 3 is a top view of my machine and the motor for operating it mounted on a common base.

In the drawings, 1 designates a base, upon which is mounted the winding machine 2 and the motor 3.

The winding machine 2 comprises the base 4 having integral therewith the pedestal 5 provided with the bifurcations 6 and 7. Preferably for lightness, the base 4, the pedestal, and its bifurcations are formed hollow.

In the top portions of the bifurcations 6 and 7 of the pedestal are formed the alined bearings 6′ and 7′ respectively. In the bearing 6′ is journaled a shaft 8, upon the outer end of which is fixedly mounted a gear wheel 9, and on the inner end portion of the shaft is fixedly mounted a hollow friction cone 10.

In the bearing 7′, in alinement with the shaft 10, is journaled a shaft 12, which, on an end portion 13 projecting between the bearings 6′ and 7′, has fixedly mounted thereon the friction cone 14, that is complementary on its outer face to the inner face of the cone 10. The shaft 12 has a portion 15 that is taperingly reduced in diameter toward its outer end, and has fixedly mounted on the outer end portion thereof a friction head 16, having the end socket 17 in which is secured the elastic cushion 18, having its outer end face slightly cupped to receive and frictionally engage the knurled stem of a stem winding watch.

The inner end portion of the shaft 8 is provided with an axial socket bore 19, and the end portion 13 of the shaft 12 has a reduced axial extension 20 that is adapted to freely but not loosely move longitudinally of the socket.

Between the friction cones 10 and 14 there is mounted on the extension 20 of the shaft 12, the helical spring 21, adapted to normally hold the cones slightly separated from frictional engagement, but which yields under pressure on the cushion 18 of the friction head 16 of the shaft 12 to permit the frictional engagement of the cones by lengthwise movement of the shaft 12.

Parallel with and below the bearing 6′, in the bifurcations 6 of the pedestal, is provided a bearing bolt 22, extending through a suitable orifice in the bifurcations. The bolt is provided with a head portion 23 having a journal extension 24 eccentric of the axis of the bolt, and the opposite end portion of the bolt is threaded and provided with a nut 25, which being run in thereon draws the head 23 tightly against the outer face of the pedestal. The journal 24 has revolubly mounted thereon the pulley 26, the hub 27 of which has concentrically secured to its inner end portion a pinion 28, adapted to intermesh with the gear wheel 9 of the shaft 8. The outer end of the journal 24 is tapped to receive the stud screw 29, the head of which is adapted to retain the pulley on the journal. The journal 24 being eccentric to the axis of the bolt 22, the bolt may be adjusted to regulate the depth that the teeth of the pinion 28 intermeshes with the teeth of the gear wheel 9.

The pulley 26 is connected by a belt 30, (shown in dotted lines in Fig. 3) with the pulley wheel 31 on the shaft 32 of the electric motor 3. Preferably the base 1 is provided with a casing 33′ which incloses both the motor 3 and the machine 2, excepting only the friction head 16. Thus constructed, when the motor is running, the belt 30 revolves the gear wheel 9 and the shaft 8. The pulley 26, the pinion 28, and the gear wheel 9, are so proportioned to each other and to the pulley 31 of the motor, as to reduce the speed of the shaft 8 to a desired speed for the shaft 12.

To wind a watch, the knurled winding stem of the watch is pressed against the cushion 18 of the shaft 12 with sufficient force to move the cone 14 into engagement with the cone 10, which thereby frictionally revolves the shaft 12 with the shaft 8, and the shaft 12 revolves the stem of the watch with it until the increasing resistance of the spring of the watch, gradually overcomes the friction of the cones 10 and 14, and brings the shaft 12 slowly to a stop. The stem is then withdrawn from engagement with the cushion 18, and in like manner, the stem of each one of a stock of watches that are to be wound is applied to the cushion 18 until the whole lot is wound up.

By giving the friction faces of the cones 10 and 14 the proper area and degree of pitch, and lubricating the friction surfaces, they are made frictionally sensitive to the winding resistance of a watch spring, so that unskilled persons may use the machine without liability to overwind a watch, and by the use of the machine the time and labor required to keep a large number of watches wound and running is very greatly reduced.

What I claim to be new is—

1. In a watch winding mechanism, the combination of a revoluble driving member, a revolubly driven member adapted to be frictionally revolved by the driving member, said driven member being movable longitudinally of its axis and having an axial friction cushion, a spring adapted to normally separate the driven from the driving member, and to yield to pressure on the cushion and permit the driven member to be thereby moved into frictional engagement with the driving member, and adapted to automatically withdraw the driven member from such engagement when the pressure on the cushion ceases, and means to revolve the driving member, substantially as and for the purpose set forth.

2. In a watch winding machine, the combination with a rotatable main shaft provided with the concentric friction surface, of a rotatable and longitudinally movable winding shaft, provided with an end friction cushion, and with a concentric friction surface complementary to the friction surface of the main shaft, and adapted to be brought into contact therewith by longitudinal movement of the winding shaft, produced by pressure on the cushion, a spring normally separating the friction surfaces of the shafts and adapted to yield to pressure on the cushion and permit contact of the friction surfaces, and to separate the surfaces when the pressure on the cushion ceases, and means to revolve the main shaft, substantially as and for the purpose set forth.

3. In a watch winding machine, the combination of a main shaft, having an end friction cone, a winding shaft in alinement with the main shaft, having a friction cone on the end adjacent to the main shaft, complementary to the cone of the main shaft, said winding shaft being movable longitudinally, and having a friction push cushion on the end opposite its friction cone, a spring normally and yieldingly separating the friction cones, and means to revolve the main shaft, substantially as set forth.

In witness whereof I have hereunto signed my name in the presence of two subscribing witnesses, this 1st day of September, 1909.

LISLE T. SCOTT.

In presence of:
Wm. J. Fritsche,
M. S. Smith.